United States Patent [19]
Hale et al.

[11] 3,904,770
[45] Sept. 9, 1975

[54] PROCESS OF TREATING MEAT
[75] Inventors: Michael John Hale, Clifton; Arthur Ernest Hawkins, Bedford, both of England
[73] Assignee: Lever Brothers Company, New York, N.Y.
[22] Filed: Dec. 11, 1972
[21] Appl. No.: 313,713

[30] Foreign Application Priority Data
Dec. 10, 1971 United Kingdom............... 57387/71

[52] U.S. Cl. ................ 426/645; 426/646; 426/657; 426/480
[51] Int. Cl.².......................................... A23L 1/31
[58] Field of Search ........... 426/480, 518, 149, 212, 426/274, 371, 382

[56] References Cited
UNITED STATES PATENTS
2,820,709  1/1958  Schack et al. ...................... 426/480
3,028,243  4/1962  Robertson et al. ................. 426/480
3,112,203  11/1963  Watt................................. 426/480

Primary Examiner—A. Louis Monacell
Assistant Examiner—R. A. Yoncoskie
Attorney, Agent, or Firm—James J. Farrell, Esq.

[57] ABSTRACT

The invention provides a process of obtaining cooked meat fibres to be used in the preparation of restructured meat products, which fibres are substantially free from coarser material such as connective tissue of meat, unbroken or partly broken meat, balled up meat fibre, lumps of fat etc.

The process involves the steps of breaking down cooked meat to a loose mass e.g. of a bulk density of 0.2 – 0.45 grams/cm³, exposing said mass to an ascending gas stream and separating the meat fibres from the coarser material, preferably by a screen having apertures of 4 – 400 mm².

9 Claims, 1 Drawing Figure

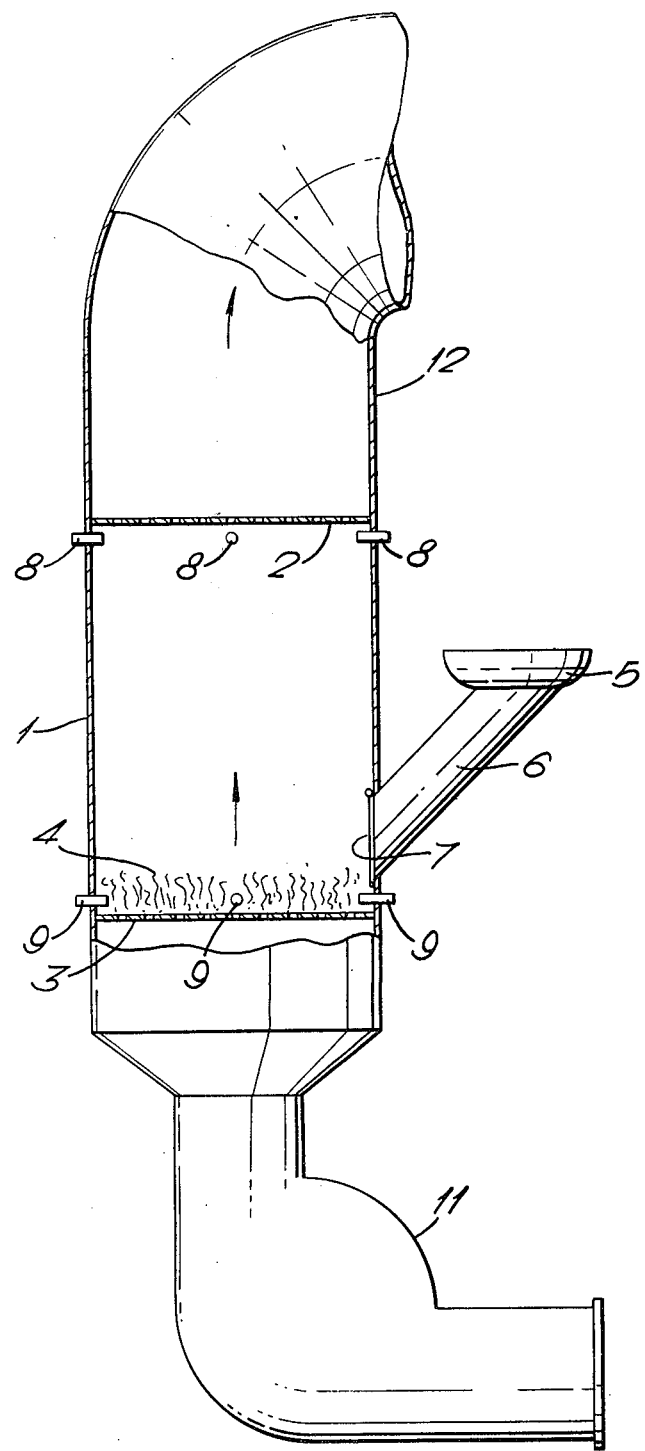

PROCESS OF TREATING MEAT

BACKGROUND OF THE INVENTION

1. Field of the Invention

This invention relates to a process of obtaining cooked meat fibres to be used in restructured meat. A low bulk density mass of meat fibres, which by means involving shearing rather than cutting can be obtained from cooked meat, contains coarser material such as coarse connective tissue of meat, unbroken or partly broken meat, balled up meat fibre, lumps of fat etc.

By the process of the invention such coarser material is separated from the meat fibres. The fibres substantially free from coarser material is useful for the incorporation in comminutes of raw lean meat taken from cuts of low quality e.g. forequarter of beef to obtain a restructured meat product which on cooking develops a desirable chewy but not tough texture.

Since such restructured meat is generally prepared by extrusion of a mass containing meat fibres and binding agents through relatively narrow extrusion gaps, which can easily be blocked by coarser material, the invention also serves an important technical requirement.

2. The Prior Art

In Canadian Pat. No. 596,001 an apparatus is described suitable for separating meat e.g. from neck and other bones of chickens, turkeys and other fowls, for removing the edible from inedible portions of certain seafoods e.g. crabs, lobsters, fish and the like as well as for removing edible from inedible portions of certain animals.

This apparatus comprises a screening cage which by oscillatory movement and frequent sharp changes in the direction of movement will project the material to be treated which is contained in said cage with violent impact against the walls of the cage.

In this way it will be possible to separate the meat from very coarse material such as bones etc, but it will be evident that non fibrous material having dimensions similar to those of the coarse material which is separated by the process of the instant invention, will not effectively be separated.

DESCRIPTION OF THE INVENTION

According to the invention, cooked meat is first broken down to form a loose mass of cooked meat fibre and coarser material such as coarse connective tissue. (By the term 'loose mass', we mean simply that the mass is of low bulk density; the fibres in it may be, and often are, much tangled with one another). The low bulk density mass is then exposed to an ascending stream of gas thereby separating the meat fibres from the coarser material and subsequently the meat fibres are removed from the stream of gas. In this specification the term "coarser material" includes non fibrous material which at least in its major dimension is larger than the smallest dimension of the separated meat fibres. Preferably the cooked meat is broken down to a mass of a bulk density of 0.2 to 0.4 or 0.45 grams/cm$^3$ particularly 0.25 – 0.35 grams/cm$^3$. Since meat fibres prepared from cooked meat of a high fat content tend to stick together after the meat has been broken down thereby detrimentally affecting the efficiency of the separation, it is preferred to use cooked meat of a relatively low fat content e.g. 2 – 20%, particularly 5 – 10%. In this specification all percentages and proportions are by weight unless otherwise stated. Although the meat fibres can e.g. by careful control of the bulk density and adjustment of the gas velocity etc. be separated from the coarser material and removed from the stream of gas after it has been ascended over a certain distance which by relatively simple experiments can be determined, the meat fibres are preferably separated from the stream of gas by carrying them upwardly through a screen which is substantially impervious to the coarser material. Although the length of the meat fibres can be much greater that the width of the screen apertures, the fibres are nevertheless able to pass such a screen, probably because the flow of gas promotes alignment of the cooked meat fibres in a direction generally at right angles to the screen, whose apertures the fibres are thus enabled to negotiate. However, such bits of coarse material (particularly coarse connective tissue and gristle) as reach the screen are not able to penetrate it; and having lost their momentum, they then for the most part fall back under their own weight, leaving the screen apertures unblocked.

It has surprisingly been observed that alignment of broken down cooked meat in a gas stream almost exclusively takes place with meat fibres and that coarse material even of such dimensions that it could pass the screen if it was similarly orientated in the gas stream as the meat fibres, is sufficiently separated from the meat fibres by that screen.

This observation makes it possible to effect a proper separation and an improved throughput by using a screen having greater apertures than the one which would be selected after studying the histogram of the dimensions of all material present in the broken down meat.

With any particular cooked meat it is a simple matter to choose a screen whose apertures will allow passage of the desired fibre without allowing passage of any substantial amount of undesirable coarse material.

The dimensions of the apertures of the screen will of course depend upon the sizes of the fibres to be used in the restructured meat products on the one hand and the sizes of the coarse material to be removed on the other hand. Where the fibres are required for meat products obtained by extrusion of a meat fibre containing mass through small holes to give threads which are later compacted, the diameters should be such that no blockages of the extrusion holes takes place.

When the fibres are required for meat products prepared by extrusion of a mass through greater holes to provide extruded slabs or logs, the fibres may be quite large, but there must be no lumps of connective tissue to offend the consumer.

Suitable products of these types are prepared by carrying the meat fibres upwardly through a screen which is substantially impervious to the coarser material, preferably a screen which is substantially impervious to the non-aligned coarser material. The apertures of such screens can vary from 4 to about 400 mm$^2$. The meat fibres of the former type, which are of a diameter of about 0 – 1 mm, preferably 0.2 – 0.8 mm and a length of 0 – 35 preferably 5 – 25 mm can be sorted out by screens having apertures ranging from about 4 to 20 or 30 mm$^2$. The meat fibres of the latter type, which are of a diameter of about 0 – 2 mm preferably 0.2 – 1.0 mm and a length of 0 – 50 preferably 5 – 50 mm are preferably sorted out by screens having apertures ranging from about 20 – 400 mm$^2$.

The low bulk density mass of broken down cooked meat should be exposed to an ascending gas stream of sufficient velocity to promote alignment of the cooked meat fibres to allow them to pass the screen. This velocity depends on various factors, e.g. the geometry of the equipment used, the fibre size and the moisture and fat content of the fibres, and can easily be determined by some experiments. Suitable gas velocities vary from about 200 – 2000 m/min; preferably the gas consists of air or nitrogen.

In a preferred way of carrying out the invention, the loose mass of cooked meat fibres and coarse material is carried on a support screen, and the stream of gas which is to carry the fibre content from the mass is passed through this support screen before it contacts the mass. Preferably this support screen is vibrated during operation. It is also possible to expose the loose mass at least intermittently on the support screen to a current of air (or other gas inert to the meat) which is directed essentially transversely of the ascending stream, so as to facilitate release of cooked meat fibres from the mass into the ascending stream. This is conveniently done by directing jets of compressed air immediately above and generally parallel with the surface of the support screen. Similarly, a transverse current of air or other gas can be directed immediately below and generally parallel with the surface of the screen that filters out coarser material from the stream of ascending gas, so as to dislodge from the apertures of that screen such bits of coarser material as become enmeshed there.

According to a preferred method, breaking down of cooked meat into its constituent muscle fibres can be achieved by subjecting the pieces of cooked meat e.g. cubes with sides of ½ - 2 inches, preferably after separation of any gross fat deposits, to a shearing or rubbing action rather than a cutting action e.g. in a conventional bowl chopper with a blade setting from the wall of the bowl e.g. of not less than about 2 mm and preferably about 3 – 4 mm. Normally, when a bowl chopper is used for chopping raw meat, the rotating blades are set to a finer gap of from 0.5 – 2mm clearance from the bowl wall in order to achieve very fine subdivision of the meat, but we have found that the use of such a fine setting when bowl chopping lean cooked mammalian or poultry meat generally results in subdivision to a very fine state where the proportion of muscle fibre bundles greater than 2 mm in length is small. However, by operating a bowl chopper with the wider blade setting, the cooked meat can thereby be rubbed apart rather than chopped, with a result that the individual muscle fibre bundles of the cooked meat can be readily teased apart and separated from each other without undue shortening in length.

Especially a cutter mixer e.g. of the type "Hobart" vertical cutter mixer bowl model VCM 25, in which apparatus when properly adjusted — such shearing actions takes place is preferably used for the purpose of the invention. By some simple experiments in which the gap between the revolving blade and the wall is adjusted until a loose mass of the required bulk density and fibre size is obtained, the optimal blade setting for the various commercially available apparatus can be determined.

The invention also provides an apparatus for carrying out the process of the invention, which comprises means for breaking down cooked meat to form a mass of low bulk density, means for generating an ascending gas stream through said mass of low bulk density and means for separating meat fibres from the coarser material.

Preferably the apparatus comprises a tower for conducting the gas stream and having an inlet for the mass of low bulk density and an outlet for the separated cooked meat fibres in which tower a first screen is located through which screen the upwardly carried meat fibres can pass but which is substantially impervious to the coarser material and a second screen acting as a support screen for the mass of low bulk density which second screen is located below the first screen such that through said second screen the stream of gas is passed before it contacts the mass and such that sufficient separation of meat fibres and coarser material can take place and means for generating the gas stream of sufficient velocity to promote alignment of the meat fibres to allow them to pass the first screen.

The invention will now be further described with reference first to the accompanying drawing, which is a diagram of an apparatus for carrying it out, and then to the Examples following.

The apparatus comprises a chamber 1 whose upper wall is formed by a filter screen 2. The lower wall of the chamber is formed by a support screen 3, onto which loose cooked meat material 4 can be fed from a hopper 5 via a duct 6 closable by a flap 7 hinged at its upper edge. At the level of the support screen, a part (not indicated) of the vertical wall of chamber 1 is detachable to allow access to the chamber for the removal of coarse tissue not able to pass the filter screen 2.

Around the vertical walls of chamber 1, adjacent the filter screen 2 and support screen 3 respectively, are nozles 8 and 9 by which compressed air can be intermittently directed across the chamber and adjacent to the surfaces of the screens.

At its lower end, chamber 1 is connected to a blower 11, conveniently a tangential fan, and its upper end to a duct 12 through which the cooked meat fibres which are carried through filter screen 2 after release from the material 4 pass on their way to a collection vessel.

EXAMPLE 1

Frozen cooked topside of beef cut into cubes of 5 cm side was allowed to thaw for 16 hours at 2°C and then treated in a cutter/mixer to break down its structure, with severance of the fine connective tissue binding the cooked meat fibres into fibre bundles. This operation necessarily brings about release from the meat structure of coarse connective tissue, gristle, and other material that would be disagreeable to bite on in a restructured meat product. (A very suitable cutter/mixer with which to break down the structure of the meat is the Hobart Vertical Model 25, equipped with dough knife No. 40; the cutters are operated at full speed — about 3,000 rpm — for 15 seconds.) Gross bits of gristle and the like were removed by hand from the fluffy mass of broken-down meat, and the mass was then admitted to chamber 1 of the apparatus shown in the drawing, to form on the support screen 3 a layer from 2 to 5 cm deep. The blower 11 was then started up.

Under the following conditions, the results were as indicated below.

Average velocity of upward air stream from blower 11 = 300 metres/minute (1000 ft/min.).

Screen characteristics:

Filter (screen 2): apertures, 4 mm × 4 mm; wires 1 mm diameter
Support (screen 3): apertures, 0.5 mm × 0.5 mm; wires 0.3 mm diameter
Distance between screens 2 and 3: 22 cm.

RESULTS

Meat fibre product passing filter screen 2 a. Yield = 25% by weight of initial loose mass.
b. Product fluffy, easily separable into individual fibres, and easy to distribute uniformly in raw meat comminutes.
c. Range of size
   Fibres predominantly of diameter 0.1 – 0.2 mm, of variable length.
   Other fibres present had:

| Length (mm) | Diameter (mm) |
|---|---|
| 6 | 1.6 |
| 3 | 0.7 |
| 1.5 | 0.7 |
| 17 | 0.6 |
| 9 | 0.5 |
| 15 | 0.4 |
| 17 | 0.3 |

Residual coarse material on support screen 3

This consisted predominantly of coarse connective tissue, lumps of meat which had not been fully broken down in the cutter/mixer, and matted fibre. There were also a few balls of fat. Typical dimensions (in mm) were:

| | |
|---|---|
| Coarse connective tissue | 11 × 5 × 3 |
| | 8 × 2.4 dia. ⎫ |
| | 6 × 1.3 dia. ⎪ |
| | 2.7 × 1.9 dia. ⎬ shreds |
| | 4 × 1.6 dia. ⎭ |
| Lumps of meat | 25 × 15 × 10 |
| | 20 × 5 × 3 |
| Matted fibre pieces | 20 × 12 × 10 |
| | 20 mm. dia. (ball) |
| Fat | 5 mm dia. (ball) |

EXAMPLE 2

The procedure of Example 1 was followed generally, with the differences that (i) the structure of the cooked meat was broken down by means involving shearing rather than cutting, so as to obtain a loose mass with a relatively high content of cooked meat fibres that were very long; and (ii) the filter screen 2 employed had apertures 19 mm × 19 mm, with wires of diameter 2 mm.

The product passing filter screen 2 was of much greater average fibre length than in Example 1. Typical dimensions were:

| Length (mm) | Diameter (mm) |
|---|---|
| 52 | 0.73 |
| 45 | 0.73 |
| 40 | 1.02 |
| 36 | 0.84 |
| 35 | 0.54 |
| 28 | 0.95 |
| 15 | 1.08 |

The coarse residue remaining on the support screen 3 was predominantly connective tissue and unbroken bits of meat. Typical dimensions (mm) were:

| Connective tissue (Flakes) | Length | Breadth | Thickness |
|---|---|---|---|
| | 28 | 10 | 1.5 |
| | 27 | 15 | 1.5 |
| | 25 | 20 | 1 |
| | 25 | 4 | 2 |
| | 24 | 8 | 2 |
| | 15 | 12 | 3 |
| (Strands) | 80 | 1.5 | 1.5 |
| | 30 | 2 | 2 |
| | 30 | 2 | 1.5 |
| | 20 | 2 | 2 |

| Lumps of Meat | Length | Breadth | Thickness |
|---|---|---|---|
| | 12 | 5 | 3 |
| | 8 | 4 | 2 |
| | 8 | 2 | 1 |
| | 7 | 2 | 1.5 |
| | 5 | 1.5 | 1 |

EXAMPLE 3

Example 1 was repeated for three times using different filter screens.

In experiment A a filter screen having apertures of 19 × 19 mm was used, in experiment B of 11 × 11 mm and in experiment C of 5 × 5 mm.

The following results were obtained:
19 × 19 filter screen gave 145 g meat fibres through and 32 g coarse material left behind.
11 × 11 filter screen gave 150 g. meat fibres through and 28 g coarse material left behind.
5 × 5 filter screen gave 79 g meat fibres through and 100 g coarse material left behind.

The material left behind on the support screen was examined with both the 19 × 19 mm and the 11 × 11 mm filter screen. 4 types of material were observed:
i. unbroken or partly broken pieces of cooked meat
ii. balled up fibre
iii. sheets of connective tissue
iv. lumps of fat covered in fine fibre dust.

The sizes were typically:
i. 19 × 7 × 5 mm, 25 × 3 × 3 mm, 18 × 7 × 2 mm
ii. discs (diameter first) 15 × 10 mm, 12 × 7 mm, 14 × 9 mm
iii. practically none left with the 19 × 19 mm filter screen, only material with meat still attached eg 30 × 25 × 5 mm, 27 × 20 × 5 mm. With the 11 × 11 mm filter screen there was a fair amount of material only 8 × 8 mm showing the trapping effect of the filter screen. Plenty of pieces were present up to 15 × 11 × 3 mm.
iv. typically 8 × 8 × 3 mm.

The material left behind with the 5 × 5, mm filter screen was of the same type as with the 19 × 19 and 11 × 11 mm screens, but had in addition finer material.

The sorted meat fibres that passed the screens was examined very carefully and the maximum cross sections given below are not typical, but were found exceptionally.

EXPERIMENT A

Partly broken up fibre maximum length 32 mm with a cross section dimension as high as 5 mm.

Tangled disc-like mats of balled up fibre up to 12 mm in diameter and several mm thick.

Quantities of connective tissue 3 – 5 mm thick with dimensions as high as 27 × 15 mm and with many pieces of the order of 10 × 10 mm.

EXPERIMENT B

Partly broken up fibre max, length 35 mm and many in the 20 – 25 mm range.

Maximum dimensions 3.5 × 2.1 mm.

Quantities of connective tissue sheet thickness up to 3.0 mm, dimensions 20 × 8 mm, 18 × 10 mm, 11 × 7 mm.

EXPERIMENT C

It was noticeable that there were many more long fibres with this screen than with the 4 × 4 mm screen used in Example 1. Maximum length 16 mm, maximum cross section 2.0 × 1.4 mm. Typical cross sections were 0.6 × 0.4, 0.6 × 0.6, 0.4 × 0.4 mm.

What is claimed is:

1. A process of obtaining cooked meat fibres substantially free from coarser material which comprises:
    A. rubbing or abrading cooked meat to form a loose mass of fibrous and coarse material of a bulk density of 0.2 – 0.45 grams/cm$^3$
    B. exposing said mass to an ascending stream of air or nitrogen of sufficient velocity to promote alignment of the fibrous material
    C. separating the fibrous material from the coarser material by carrying the fibrous material by means of the ascending stream through a screen which is substantially impervious to the coarser material.

2. A process of obtaining cooked meat fibres substantially free from coarser material which comprises:
    A. rubbing or abrading cooked meat of a fat content of 2 – 20% to form a loose mass of fibrous and coarser material of a bulk density of 0.2 – 0.45 gram/cm$^3$
    B. exposing said mass to an ascending stream of air or nitrogen of a velocity of 200 – 2000 m/min
    C. separating the fibrous material from the coarser material by carrying the fibrous material upwardly through a screen having apertures ranging from 4 to 400 mm$^2$ by means of the ascending stream.

3. Process according to claim 1 in which the loose mass has a bulk density of 0.25 – 0.35 grams/cm$^3$.

4. Process according to claim 1 in which the cooked meat has a fat content of 5 – 10%.

5. Process according to claim 1 in which before exposing the loose mass to the stream of gas the loose mass is fed to a support screen through which the stream of gas is passed before it contacts the loose mass.

6. Process according to claim 5 in which the support screen is vibrated.

7. Process according to claim 5 in which the loose mass is at least intermittently exposed to a current of gas which is directed essentially transversely to the ascending stream.

8. Restructured meat products substantially free from coarse material and containing the cooked meat fibres obtained by the process of claim 1.

9. Cooked meat fibres substantially free from coarser material which have been obtained by the process of claim 1.

* * * * *